Figure 1:
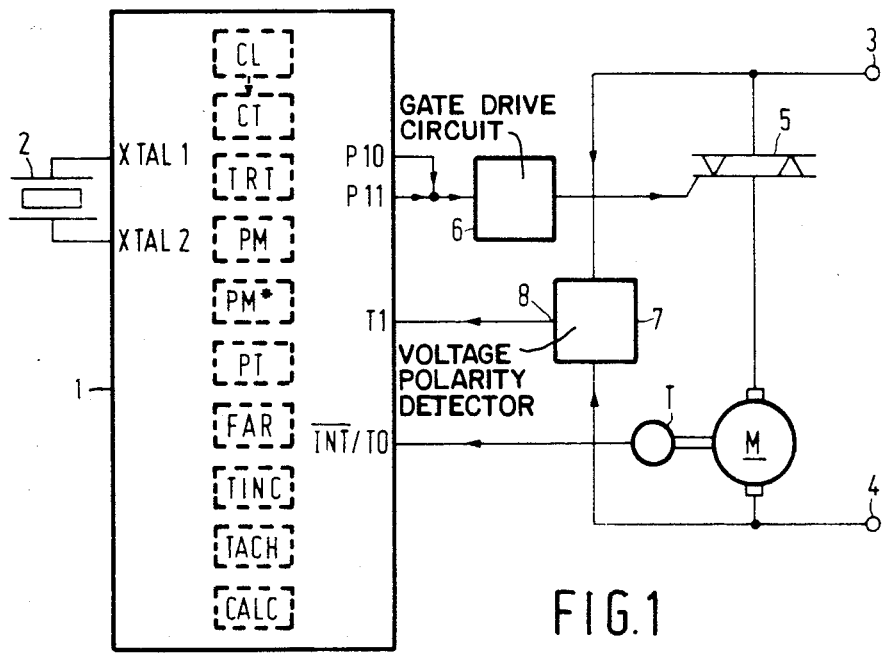

United States Patent [19]

Taylor

[11] Patent Number: 4,584,507
[45] Date of Patent: Apr. 22, 1986

[54] MOTOR SPEED CONTROL ARRANGEMENT

[75] Inventor: Clive R. Taylor, London, England

[73] Assignee: U.S. Philips Corporation, New York, N.Y.

[21] Appl. No.: 654,835

[22] Filed: Sep. 26, 1984

[30] Foreign Application Priority Data

Sep. 28, 1983 [GB] United Kingdom ............... 8325897

[51] Int. Cl.⁴ .......................... H02P 5/00; H02P 5/40
[52] U.S. Cl. ................................ 318/327; 318/314; 318/317; 318/341; 318/326
[58] Field of Search ............... 318/301, 309, 311, 312, 318/314, 315, 317, 318, 319, 323, 326, 327, 329, 336, 339, 341, 342, 345 A, 345 D, 345 E, 345 H, 599, 600, 601, 616, 617, 618, 628; 323/217, 237, 265, 283; 364/474, 174, 166, 167

[56] References Cited

U.S. PATENT DOCUMENTS

| 4,054,820 | 10/1977 | Foster | 318/341 |
| 4,216,419 | 8/1980 | Van Dam et al. | 318/327 |
| 4,254,367 | 3/1981 | Sakamoto | 318/318 X |
| 4,287,458 | 9/1981 | Nakamura et al. | 318/341 |
| 4,311,949 | 1/1982 | Pelkmann et al. | 318/314 X |
| 4,323,832 | 4/1982 | Okamura | 364/167 X |
| 4,371,819 | 2/1983 | Kaufmann | 318/318 X |
| 4,427,933 | 1/1984 | Wagener et al. | 318/345 E X |
| 4,479,078 | 10/1984 | Kidd et al. | 318/138 X |

Primary Examiner—William M. Shoop, Jr.
Assistant Examiner—Shik L. P. Ip
Attorney, Agent, or Firm—Robert T. Mayer; Bernard Franzblau

[57] ABSTRACT

A variable motor speed control arrangement of the tachogenerator feedback loop type comprises a triac (5) connected in series with the motor (M). The triac is fired in each half cycle of the AC mains supply. The firing angle of the triac is varied to provide the required control. The arrangement employs a single cycling counter (CT) to time the interval between two output pulses of the tachogenerator (T) in order to determine the current motor speed and also to provide a countdown from the beginning of each half cycle to the required firing instant. The control processes are carried out in periods beginning at each counter overflow instant. This breaking up of the processing, together with the use of the single counter allows a microcomputer (1), which is running other programs to provide the speed control in addition.

15 Claims, 8 Drawing Figures

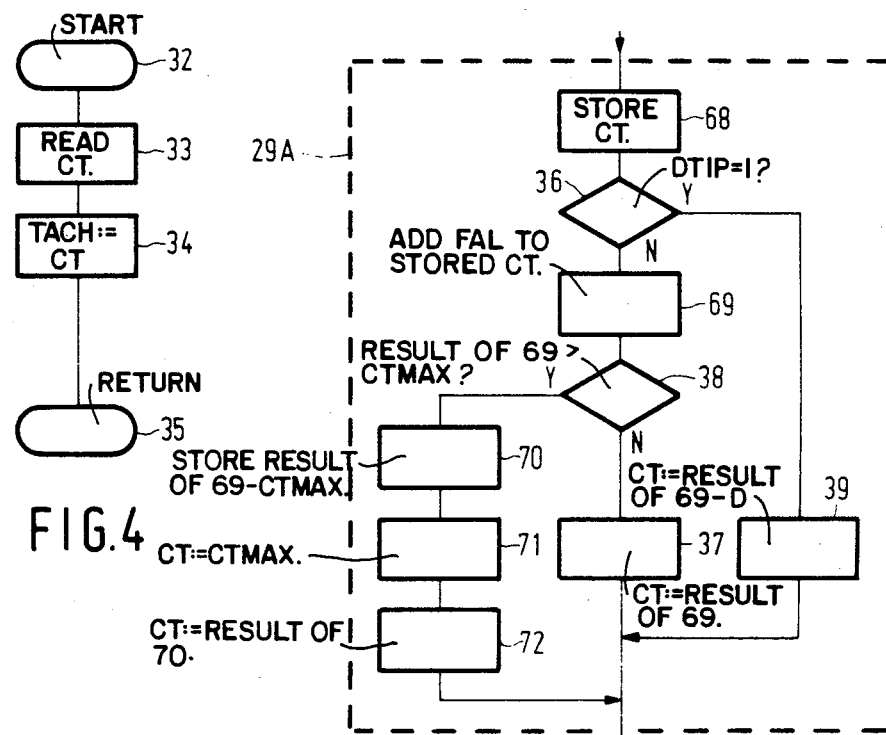
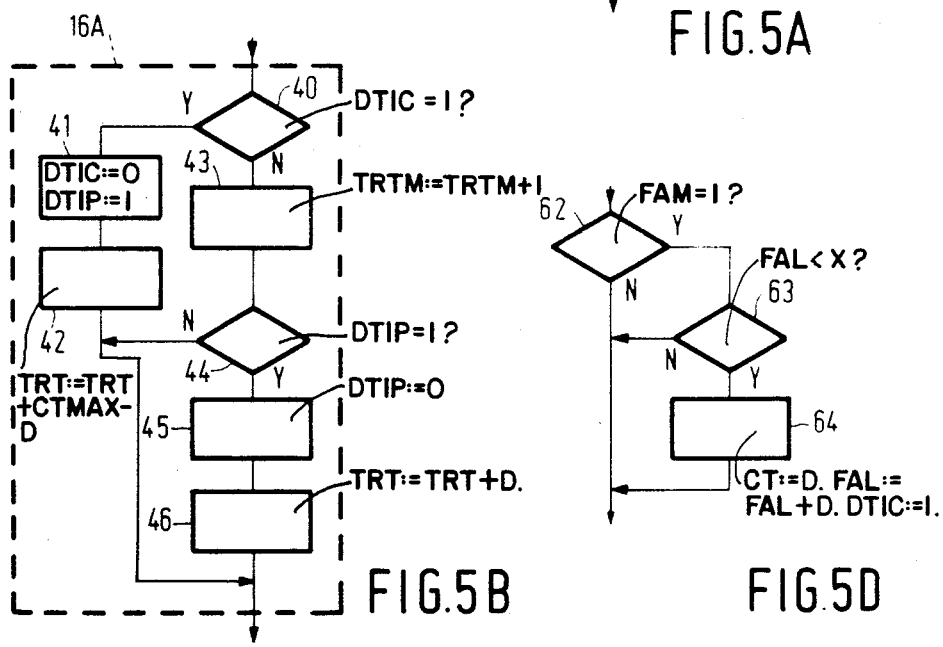
FIG. 4  FIG. 5A  FIG. 5B  FIG. 5D

MOTOR SPEED CONTROL ARRANGEMENT

This invention relates to a motor speed control arrangement for changing the speed of a motor to, and/or maintaining the speed of the motor at, any required speed within a given range in dependence upon the difference (if any) between the actual speed of the motor, as represented by the periodicity of pulses from a tachogenerator driven by the motor, and the required speed. The speed is varied by controlling the phase angle in each half cycle of a mains voltage supply at which a controlled semiconductor switch is fired by the control arrangement. The switch is connected in series with the motor across the mains voltage supply.

Such a speed control arrangement therefore has to time the periodicity of the output signals of the tachogenerator, which signals are often in the form of pulses which can appear at any time in any half cycle. A counter/timer can be used for this purpose, the count value indicating the current speed of the motor. This value can be compared with a corresponding indication of the required motor speed and a calculation can be performed to determine the instant at which the switch should be fired in order to provide the required amount of power to the motor to cause it to change to, and/or maintain, the required speed.

Thus, such a speed control arrangement has to perform three main functions, namely
(i) determine the period of the tachogenerator output signals,
(ii) calculate the delay time or firing period from the mains voltage zero crossing (MZC) to the required firing instant (usually referred to as the "firing angle") and time this delay, and
(iii) fire the switch at the end of the time delay.

For various reasons, the period in which the switch is allowed to fire may be limited to the range coinciding with approximately 15% to 95% of the period of each half cycle of the mains voltage supply. If this is the case then, with a 50 Hz supply, the switch may be fired at any instant from 1.5 mS to 9.5 mS after the MZC at the beginning of the half cycle. Even if this is the case the instant at which the switch is required to be fired can still lie anywhere within a large part of each half cycle. Similarly, the instants of arrival of the tachogenerator output signals can occur at any instant or instants in a half cycle of the supply voltage.

Due to the overlapping timing requirements of the tachogenerator signal period and of the firing angle, and also due to the arbitrary nature of the relationship between the instants determining the two timing periods, it is known to use a first counter/timer for measuring the tachogenerator period and a second counter/timer for generating the firing angle time delay.

In modern electronically-controlled washing machines, for example, the electronic system has two main functions, namely to control the progress of the selected programme and to control the speed of the motor which drives the washing drum. It is generally known to use a micro-computer for the programme control function, and the control of the speed of the motor which drives the drum is usually effected by separate electronic circuitry, either in the form of discrete component circuitry or of a separate integrated circuit. Consideration has frequently been given to combining these two main functions in a single micro-computer integrated circuit since this would give an obvious saving in cost. Additionally, with a separate speed control circuit several output pins on the micro-computer are used for passing information to that circuit concerning the required speed at any instant. These pins would be saved if the speed control could be included in the micro-computer and this would enable them to be used to extend the facilities available from the micro-computer, for example to provide fault indication and control.

An object of the present invention is to provide a motor speed control arrangement which enables one of the two counter/timers dedicated to the speed control function to be dispensed with and hence which can be more suitable for inclusion in a micro-computer.

According to the invention there is provided a motor speed control arrangement for changing the speed of a motor to, and/or maintaining the speed of the motor at, any required speed within a given range in dependence upon the difference (if any) between the actual speed of the motor, as represented by the periodicity of signals from a tachogenerator driven by the motor, and the required speed. The speed is varied by controlling the phase angle in each half-cycle of a mains voltage supply at which a controlled semiconductor switch is fired by the control arrangement. The switch is connected in series with the motor across the mains voltage supply. This arrangement comprises a clock-driven cycling counter the cycle frequency of which is a plurality of times the frequency of individual half-cycles of the mains voltage supply. The counter is arranged to supply an interrupt signal each time it overflows. The arrangement also comprises first storage means for a number representative of the time elapsing between the arrival instants of a first and a subsequent second tachogenerator signal, second storage means for a number representative of the time which would elapse between the first and second tachogenerator signals if the motor were running at the correct speed, and third storage means for receiving a number determined by the firing period from the beginning of a mains half-cycle to the instant in that half-cycle at which the switch is required to be fired in order to provide the appropriate speed control. The said arrangement is arranged to perform the operations of (a) responding to the arrivals of the first and second tachogenerator signals by reading the contents of the counter at the relevant instants, (b) responding to the occurrence of at least some of said interrupt signals by adjusting the content of the first storage means in a manner such that said content eventually depends upon the values of the counter contents so read and the number of counts executed by the counter between the interrupt immediately following the occurrence of the first tachogenerator signal and the interrupt immediately preceding the occurrence of the second tachogenerator signal and thereby becomes representative of the period between said instants, (c) calculating said firing period in dependence upon the contents of the first and second storage means when the content of the first storage means has become representative of the period between said instants, (d) storing a number determined by a firing period calculated in an operation (c) in said third storage means, (e) responding to the occurrence of each zero-crossing in the mains voltage waveform by, each time a said interrupt signal occurs thereafter, decrementing a number stored in the third storage means in an operation (d) by an amount corresponding to the number of counts executed by the counter since the immediately preceding interrupt occurred or, in the case of the first said interrupt after said subsequent zero-crossing, since that zero-crossing occurred, until the number stored in the third storage means becomes smaller than that which corresponds to a complete cycle period of the counter, (f) responding further to the interrupt signal which results in the number stored in the third storage means becoming smaller than that which corresponds to a complete cycle period of the counter by setting the counter content to a value determined by the difference between the then value of the number stored in the third storage means and the total counter capacity, and (g) responding to the occurrence of the next said interrupt signal by firing said switch.

In such an arrangement, the major portion of the speed control process can be broken up into a series of separate processes each of which is inititated by a respective interrupt signal. The only events which need occur during or in between these separate processes are the arrivals of the tachogenerator signals and the consequent reading of the counter contents. These latter events can be of very short duration because all that has to be done is to read the count value of the counter into a store when each tachogenerator signal occurs. There may be considerable intervals in the periods between the various interrupt signals when the process initiated thereby has been completed, in which case other functions such as controlling the progress of the selected programme in a washing machine can be performed during these intervals. It will be appreciated furthermore that only one counter is necessary in such an arrangement to determine both the tachogenerator and firing periods quite independently of each other. Since a micro-computer which is provided with a single additional counter is known, the above features enable the speed control arrangement to be included in a microcomputer which also performs other machine control programmes, resulting in a considerable potential saving in cost.

In order that the adjustments of the content of the first storage means in operation (b) should not be able to interfere with the firing of the switch, these adjustments are preferably performed in response to all those said interrupt signals which do not result in the firing of the switch in an operation (g) and which occur after the arrival of the first tachogenerator signal up to and including the first such interrupt signal to occur after the arrival of the second tachogenerator signal.

Obviously calculation operation (c) should be reperformed at intervals in order that the number stored in the third storage means can be maintained reasonably in accord with the current speed of the motor and the desired speed. In order that, each time this occurs, an up-to-date value of the motor speed is available, the arrangement is preferably arranged to respond to the arrivals of a succession of said tachogenerator signals by repeatedly performing operation (a), each time treating the second tachogenerator signal and a subsequent tachogenerator signal as new first and second tachogenerator signals respectively, to repeat operation (b) each time the content of the first storage means has become representative of the period between the arrival instants of a pair of said tachogenerator signals so that the content of the first storage means becomes representative of the periods between the arrival instants of successive pairs of said tachogenerator signals in succession, and to repeatedly perform operation (c).

In order to reduce the likelihood that the arrangement will treat interference on the mains voltage waveform as a zero-crossing the arrangement is preferably arranged to respond to the occurrence of each zero-crossing in the mains voltage waveform by resetting the counter, and to respond to the occurrence of each interrupt signal which immediately precedes the expected arrival instant of a zero-crossing in the mains voltage waveform by polling the occurrence of such a zero-crossing.

In this way it can be arranged that the interrupt signal which immediately precedes the expected arrival instant of a mains zero crossing occurs only a short time, for example five or ten count periods of the counter, before the expected arrival instant, so that polling for the zero crossing only starts a short time before it actually occurs.

Determination of the period between the arrivals of the tachogenerator signals can be simplified if the arrangement is arranged to respond to the occurrence of the interrupt signal which results in the firing of the switch in operation (g) by setting the counter content to a value determined by the difference between the value to which it was set by the immediately preceding operation (f) and the total counter capacity so that the instant when the counter next overflows will occur a whole number of complete fill periods of the counter after the occurrence of the interrupt signal which immediately precedes the said interrupt signal which results in the firing of the switch. In this way it can be arranged that the majority of the interrupt signals occurring during a half-cycle of the mains voltage waveform are regularly periodic, enabling the content of the first store to be adjusted by the same amount (corresponding to the total counter capacity) each time such an interrupt signal occurs.

In order that the arrival of a tachogenerator signal in the period between the occurrence of the interrupt signal which results in the firing of the switch in operation (g) and the actual firing of the switch should not affect the actual firing instant, the arrangement, as a modification, may be arranged to further respond to the occurrence of the interrupt signal which results in the firing of the switch in operation (g) by disabling the arrangement response to the arrival of a tachogenerator signal until the switch is actually fired, and to replace the relevant counter content which would otherwise be utilized in operation (c) by an estimate thereof if a tachogenerator signal should arrive while the arrangement response thereto is so disabled.

It should be noted that it is not essential that the counter content represents the numbers 0, 1, 2, 3, etc. in succession in a conventional way during each cycle. It can represent these numbers in any way whatsoever provided that the remainder of the arrangement treats each representation as having the required significance. Thus, for example, the count direction, if considered conventionally, may be down rather than up. As another example the reset may be to some count which, if considered conventionally, is something other than zero or maximum count.

Figure 2:
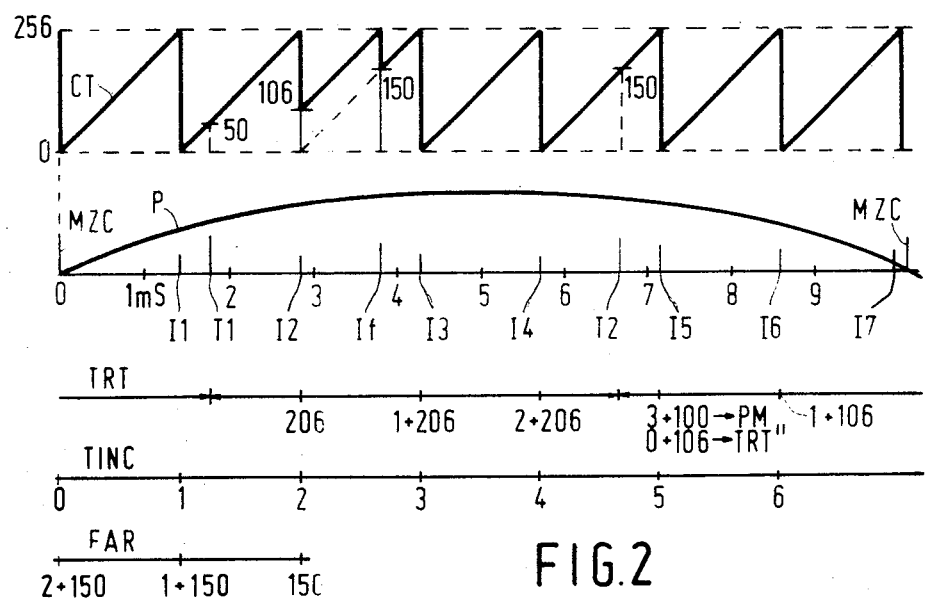
Figure 3:
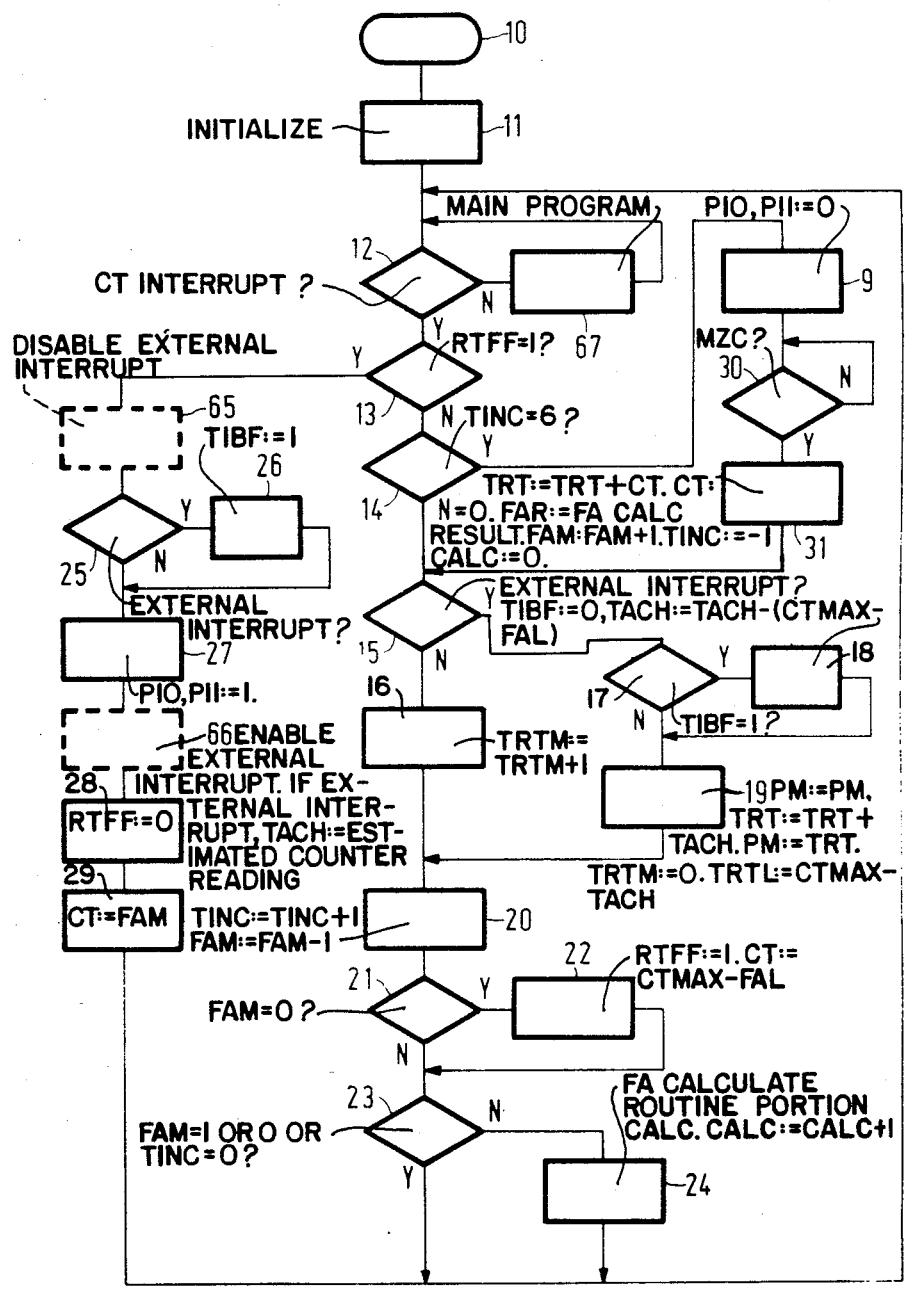

An embodiment of the invention will now be described, by way of example, with reference to the accompanying diagrammatic drawings in which:

FIG. 1 shows the embodiment schematically,

FIG. 2 is a timing chart illustrating the operation of the embodiment in one half-cycle of the mains voltage supply, FIG. 3 shows a flow chart of the operation of a microcomputer included in the embodiment of FIG. 1, FIG. 4 is a flow chart of an interrupt routine performed by the microcomputer under certain conditions, and FIGS. 5A, 5B, 5C and 5D show more detailed replacements for certain parts of the flow chart of FIG. 3.

In FIG. 1 a variable motor speed control arrangement for changing the speed of a motor M to, and/or maintaining the speed of the motor M at, any required speed within a given range, includes a microcomputer 1, for example a member of the MAB 8400 series available from Mullard Ltd., U.K. The microcomputer 1, for which only those external connections which are particularly relevant to the following description are shown, includes internally an 8-bit timer/counter CT, first, second and third storage means in the form of resgisters TRT, PT and FAR respectively and, inter alia, further storage registers TACH, PM, PM*, CALC and TINC. Timer/counter CT is driven by an internal clock CL the frequency of which is determined by an external crystal resonator 2 connected between pins XTAL 1 and XTAL 2 of the microcomputer 1. The clock CL also controls the overall operation of the microcomputer. So that counter CT is clocked once every instruction cycle carried out by the microcomputer. Each time the content of counter CT corresponds to its maximum count and receives a further clock pulse, i.e. overflows, it resets and generates an internal interrupt signal.

The motor M is connected between input terminals 3 and 4 of an a.c. mains voltage supply via a semiconductor switch in the form of a triac 5. The gate of triac 5 is controlled from paralleled pins P10 and P11 (pins 0 and 1 of port 1) of microcomputer 1 via a triac gate drive circuit 6. The phase angle in each half-cycle of the mains voltage supply at which triac 5 is fired, and hence the power supplied to the motor M, is determined by the instant within that half-cycle that microcomputer 1 generates a logic "1" signal at its pins P10 and P11.

The motor M drives a tachogenerator T the output of which is connected to an external interrupt signal input INT/T0 of microcomputer 1. When input INT/T0 is enabled the occurrence of a high-to-low transition thereon produces a jump to an interrupt routine from the process currently being carried out by the microcomputer 1. If input INT/T0 is disabled, on the other hand, the occurrence of such a transition is latched by the microcomputer hardware, so that the fact that it has occurred can be ascertained subsequently.

Mains input terminals 3 and 4 are also connected to a mains voltage polarity detector 7 which produces a logic 1 signal at its output 8 if terminal 3 is positive with respect to terminal 4 and logic 0 if terminal 4 is positive with respect to terminal 3. Output 8 is connected to a test input pin T1 of microcomputer 1, the instantaneous logic level which can be arranged to govern which branch of a program being carried out by microcomputer 1 is taken at a given time.

The arrangement of FIG. 1 operates as follows, it being assumed, for example, that crystal resonator 2 is chosen to resonate at such a frequency that counter CT is clocked at a frequency such that there are seven complete fill (cycle) periods plus a few, for example five, count periods for this counter in each half-cycle of the mains voltage waveform. With a 50 Hz mains and an eight-bit counter CT this means that counter CT is clocked at approximately 179.2 kHz.

Initially a binary-coded representation of the desired speed of motor M is entered into register PT. This may be done, for example, by programming microcomputer 1 to read a number presented to one of its ports by a user or to insert a pre-programmed number in this register. When fully operational a similarly binary-coded representation of the actual speed of motor M is entered by means of the microcomputer program into register PM after the current content of register PM has been transferred to register PM*, as will become evident hereinafter. The microcomputer 1 calculates from these three values the phase angle in each half-cycle of the mains voltage supply at which the triac 5 should be fired in order to change the motor speed to, or maintain the motor speed at, the desired speed. This phase angle is such that the trigger instant lies between 1.5 mS and 9.5 mS after the relevant mains zero-crossing. Moreover the microcomputer actually causes the triac to be fired at the correct instants.

Referring to FIG. 2 of the drawings, a positive half-cycle of a 50 Hz mains voltage supply is denoted by P and has a duration of 10 mS starting from the mains zero crossing MZC. The count values of the counter CT (FIG. 1) are represented by the sawtooth waveform also denoted by CT in FIG. 2, and the overflows of this counter would, if the counter were allowed to run freely, divide the half-cycle into just over seven equal intervals, the counter being reset when each mains zero crossing MZC occurs. An interrupt signal I is generated by the counter each time it overflows and causes a branch to an interrupt routine from the part of its main program currently being carried out by microcomputer 1. For the purpose of illustration it is assumed in FIG. 2 that the required firing angle (in terms of delay time from the MZC) for triac 5 in the relevant half-cycle has been calculated during the previous half-cycle to require a firing routine to be initiated 662 clock periods of counter CT (corresponding to two complete fill periods plus 150 clock periods) after the mains zero crossing MZC occurs, and that this has been stored during the previous half-cycle in the form of a most significant byte FAM denoting the number of complete fill periods (in the present case two) and a least significant byte FAL denoting the number of additional clock periods (in the present case 150). This stored value is transferred to register FAR at the beginning of the current half-cycle. The required initiation instant for the firing routine is denoted by If in FIG. 2. It is also assumed for the purpose of illustration of FIG. 2 that an output pulse is generated by the tachogenerator T at an instant T1 one complete fill period plus 50 count periods, i.e. 306 counts periods, after the mains zero crossing, and that the next such pulse is generated at an instant T2 four complete fill periods plus 150 count periods, i.e. 1174 count periods, after the mains zero crossing.

Unless exceptional circumstances are present (see subsequently), each time a tachogenerator pulse arrives it initiates a very short interrupt routine in microcomputer 1, in which routine the current content of counter CT is read and stored in register TACH for use in response to the occurrence of the next one of the counter-generated interrupts I1, I2, I3, I4, I5, I6 or I7 (in the present example interrupts I2 and I5 respectively) in accumulating in the register TRT a measure of the tachogenerator running time between each tachogenerator signal and the next. Similarly to the firing instant delay time, this running time TRT is stored in the form of a most significant byte TRTM denoting the number of complete counter fill periods, and a least significant byte TRTL denoting the number of additional counter clock periods. When it corresponds to the time elapsing between a first tachogenerator signal and a subsequent second tachogenerator signal it is transferred to the register PM after the current content of register PM has been transferred to register PM*, for use in the abovementioned calculation of the firing instant phase angle in conjunction with the content of registers PM* and PT, and the measurement of a new running time is initiated. Such calculations of firing angle in dependence upon the difference between actual and target speeds is well-known, an example being given in United Kingdom patent specification No. 2,102,990 (PHB 32802). If a tachogenerator signal should not occur between one of the interrupt signal I1, I2, I3, I4, I5, I6 and I7 and the next the most significant byte TRTM of the content of register TRT is incremented in response to the occurrence of the second of the two relevant interrupt signals, for example signal I4 in FIG. 2.

As indicated in FIG. 2, the most significant byte FAM of the content of firing angle register FAR is decremented in response to the occurrence of each interrupt signal I1, I2 etc. until it becomes zero, at which point the difference between the least significant byte FAL of the content of register FAR (denoting 150 in the present example) and the total capacity of counter CT (256) is loaded into the counter CT, as a result this counter overflows again 150 counting periods later, i.e. when the triac firing routine is required to be initiated, and generates an interrupt signal If which duly initiates this routine. Interrupt signal If also causes the least significant byte FAL of FAR to be loaded into the counter CT so that the counter overflows again and generates an interrupt signal I3 with the correct delay with respect to the interrupt signal I2.

As also indicated in FIG. 2 the content of register TINC is reset in response to the occurrence of the mains zero crossing MZC and then incremented in response to each subsequent timer interrupt signal I1, I2, I3, I4, I5 and I6.

The microcomputer 1 is programmed to execute a routine shown in somewhat simplified form in FIG. 3. In FIG. 3 the various blocks have the following significances.

10 —Start
11 —Initialize
12 —Has counter CT generated an interrupt signal?
67 —Main program.
13 —Is ready to fire flag RTFF set?
14 —Does content of register TINC=6?
15 —Has tachogenerator signal interrupt occurred?
16 —Increment most significant byte TRTM in register TRT
17 —Is tachogenerator interrupt before firing flag TIBF set?
18 —Reset flag TIBF. Subtract difference between capacity of counter CT and the least significant byte FAL in register FAR from content of counter CT read during tachogenerator signal interrupt (now in register TACH).
19 —Transfer content of register PM to register PM*. Add content of register TACH to content of register TRT. Transfer resulting content of register TRT to register PM. Set most significant byte TRTM in register TRT to zero and the least significant byte TRTL therein to the difference between the content of register TACH and the full capacity of counter CT.
20 —Increment content of register TINC and decrement the most significant byte FAM in register FAR.
21 —Does FAR most significant byte FAM=0?
22 —Set ready to fire flag RTFF. Set content of counter CT to the difference between the least significant byte FAL in register FAR and the full capacity of counter CT.
23 —Does FAR most significant byte FAM=1 or 0 or does content of register TINC=0?
24 —Perform that portion of routine which calculates firing angle FA from content of registers PM, PM* and PT which is indicated by content of register CALC. Increment content of register CALC.
25 —Has tachogenerator signal interrupt occurred?
26 —Set tachogenerator interrupt before firing flag TIBF.
27 —Fire triac (set pins P10 and P11 to logic 1)
28 —Reset ready to fire flag RTFF
29 —Set content of counter CT to equal the least significant byte FAL in register FAR
9 —Remove triac fire signal. (Set pins P10 and P11 to logic 0
30 —Is a zero crossing occurring in the mains voltage waveform between terminals 3 and 4? (Has logic level on pin TI changed?)
31 —Add content of counter CT to content of register TRT. Reset counter CT. Load register FAR with result of latest calculation of required triac firing angle FA. Increment most significant byte FAM in register FAR and set content of register TINC to −1. (The last two operations are to ensure that the operations 20 which are carried out almost immediately afterwards result in the required values for FAM and TINC). Reset register CALC.

In step 11 the usual initialisation procedures are carried out (e.g. setting register contents to required initial values). In addition counter CT is set to zero when a zero crossing occurs in the mains waveform applied between terminals 3 and 4, immediately after which the program proceeds to step 12 and hence to its main program (block 67). For the sake of illustration it will be assumed that the routine has been in operation for some time and it is currently waiting at test 30 for the first mains zero crossing (MZC) instant shown in FIG. 2. When the mains waveform becomes positive at the zero crossing, the routine proceeds to block 31 in which the small count of counter CT occurring since the last overflow of counter CT (counter interrupt) is added to the content of register TRT and the counter is then reset. Register FAR is also loaded with the result of the latest calculation of the required triac firing angle, the content of register TINC is set to −1 (to correct for the fact that it will almost immediately be incremented again in step 20), the most significant byte in register FAR is incremented (again to correct for the fact that it will almost immediately be decremented again in step 20) and the content of register CALC is reset to zero.

A check is then made (step 15) to see if a tachogenerator signal has been received and a count reading obtained from counter CT and stored in register TACH. No such signal has been received so the most significant byte (MSB) of the tachogenerator running time register is incremented by 1 (step 16). The content of register TINC (time interval counter) is then incremented to zero and the MSB in register FAR is restored to its previous value (step 20). As previously mentioned, a firing angle most significant byte+ least significant byte (MSB+LSB) is assumed to have been stored in register FAR at the end of the previous mains half-cycle, this MSB+LSB being 2+150 in the present example. Since the FAR MSB is 2 and TINC=0 the routine now pauses in the loop around step 12, i.e. proceeds with its main program, until the next counter interrupt I1 occurs. When this happens a check is made (step 13) to see if the ready to fire flag RTFF is set. This flag is not yet set because the firing routine is not called for in the second fill period of counter CT in the current mains half-cycle. The MSB of TRT is therefore incremented again (step 16), TINC becomes 1 and the MSB of FAR becomes 1 (step 20) and the routine then proceeds with its main program in the loop around step 12 until the interrupt I2 occurs. In the present example a tachogenerator signal occurs when the counter content is 50 before this next interrupt occurs so, in response to this interrupt, in step 19 (flag TIBF=0 as will become evident below) the current content of register PM is transferred to register PM*, a quantity 50 is added to the content of TRT, the result (representative of the period between the tachogenerator signal T1 and the preceding signal) is transferred to register PM, and the content of register TRT is set to MSB+LSB=0+(256−50)=0+206, i.e. to a quantity representing the interval between the tachogenerator pulse T1 and the interrupt signal I2, thereby starting the measurement of a new tachogenerator running time TRT'. The time interval counter TINC is incremented to 2 and the MSB in the firing angle register FAR is decremented by 1 to give MSB+LSB=0+150 in step 20. Since the MSB of FAR is now zero the ready-to-fire flag is set in step 22 and the counter CT is loaded with (256−150)=106, after which the main program proceeds in the loop around step 12 until the next interrupt signal If occurs. This signal will occur when the counter has counted from 106 to 256, i.e. 150 counts, to reach the required firing routine initiation instant.

On the arrival of interrupt If, with the flag RTFF already set the process branches at step 13 to the firing routine (steps 25-29) in which it is tested (step 25) whether a tachogenerator signal occurred since interrupt I2 (no), the triac is fired in step 27, the flag RTFF is reset in step 28, and the counter CT is loaded with the LSB of FAR (150) in step 29 so that the next counter interrupt signal I3 will occur at the regular interval of 256 counts after I2. The routine then proceeds with its main program in the loop around step 12 until interrupt I3 occurs.

When interrupt I3 occurs the MSB in register TRT is incremented in step 16 so that TRT' becomes MSB+LSB =1+206, and TINC is incremented to 3 in step 20. Because the MSB of FAR is decremented again in step 20 it now becomes −1, with the result that step 24 is performed after test 23. Because the calculation routine for the triac firing angle required from the actual motor speed represented by the number stored in register PM, the previous motor speed stored in register PM* and the target speed stored in register PT is too long to be accommodated within one complete fill period of counter CT it is divided into four portions each of which is performed once during each mains half-cycle period. Which portion is performed at any given time is governed by the content of register CALC, the portions corresponding to values 0, 1, 2, and 3 respectively of this content. No portion is performed during the first counter fill period of a mains half-cycle (TINC=0) or during the counter fill periods which imediately precede or contain the instant in which the triac firing routine is initiated (FAM=1 or 0) because of the reduced calculation times which are or may be available after the corresponding counter interrupts occur. Thus the first portion of the firing angle calculation (denoted by CALC=0) is now performed and CALC is incremented to 1. Interrupt I4 is then awaited in the loop around step 12.

When interrupt I4 occurs the tachogenerator running total TRT' is incremented to MSB+LSB=2+206 in step 16 and the interval counter TINC is incremented to 4 in step 21. The second portion of the firing angle calculation (denoted by CALC=1) is performed and CALC is incremented to 2 in step 24. Interrupt I5 is then awaited in the loop around step 12, as usual the main program being proceeded with until this interrupt occurs.

When interrupt I5 occurs a tachogenerator reading of 150 has been received and so the TRT' total is increased to MSB+LSB=2+(206+150)=3+100 in step 19. Thus the total value of TRT' is (3×256)+100=868 counting periods of counter CT and this value is also transferred to register PM in step 19, after the current content of register PM have been transferred to register PM*, for use in the next firing angle calculation. In step 19, moreover, the MSB in register TRT is set to zero and the LSB therein is set to the 256 complement of 150, i.e. 106, in order to start the calculation of the next tachogenerator running total TRT''. The timing interval counter TINC is incremented to 5 in step 20, and the routine again branches at step 23 so that the third portion of the calculation of the firing angle FA (deonted by CALC=2) is performed in step 24 and CALC is incremented to 3. Interrupt I6 is then awaited in the loop around step 12.

When interrupt I6 occurs the MSB in register TRT is incremented in step 16 so that TRT'' becomes MSB+LSB=1+106, and TINC is incremented to 6 in step 20. The fourth and final part of the firing angle calculation (denoted by CALC=3) is performed in step 24 and CALC is incremented to 4. Interrupt I7 is then awaited in the loop around step 12.

When interrupt I7 occurs the routine branches at step 14 because TINC=6 with the result that the next mains zero crossing (positive to negative) is awaited in the loop around step 30. When this zero crossing occurs the routine continues in a manner similar to that described above for the positive mains half-cycle.

It will be appreciated that had a tachogenerator signal occurred in the interval I2–If in FIG. 2 the counter reading would for the purposes of TRT, have been too high by 106, i.e. the 256-complement of the LSB of FAR. This is the reason for the steps 25 and 26 before the triac is fired in step 27, and for the steps 17 and 18. If a tachogenerator signal had been received in the interval I2-If then 106, i.e. the difference between the LSB of FAR and the full capacity 256 of counter CT, would have been subtracted from the LSB in register TRT in the next step 18. Thus when TRT is subsequently updated in the next step 19 the correct result would still be obtained.

Progress through the various steps indicated in FIG. 3 is, of course, not instantaneous, and the finite time (counting steps of counter CT) taken to progress through various parts of the program should be corrected for in the various calculations, where appropriate. For example, the content of the firing angle register FAR only determines the firing instant of the triac indirectly, via its direct determination of the instant when the interrupt occurs which gives rise to the "fire triac" routine, and this should be taken into account when calculating FAR from the contents of PM and PT. In fact the time taken to pass through the various steps can give rise to difficulties in certain situations, in particular if the triac firing routine is required to be initiated very close to (either before or after) one of the timer interrupts I1, I2, I3, I4, I5 or I6 and/or if a tachogenerator signal occurs just before one of these interrupts.

To take the last of these possible situations first, the tachogenerator signal interrupt routine may be basically as shown in FIG. 4 in which the various blocks have the following significances:

32—Start (tachogenerator T produces high-to-low transition on input INT/T0 of microcomputer 1 in FIG. 1)
33—Read content of counter CT
34—Store result of step 33 in register TACH
35—Return.

In fact the reading of the counter CT in step 33 will not follow instantaneously after the occurrence of the tachogenerator signal which gives rise to the interrupt routine, inter alia because the microcomputer 1 first has to store parameters to enable it to continue with its current program after the interrupt has been serviced, during which storage process the counter CT continues to count. The counter CT is thus read Y counts after the tachogenerator signal occurs, where Y may be of the order of ten, and thus the reading is too high by Y. This does not normally matter, as it is the same for all such readings. However, if the tachogenerator signal occurs just before, and within Y counts of, the overflow of counter CT, what should be a reading of slightly more than the maximum count of counter CT will in fact be a reading of a very small number. This difficulty can be overcome by replacing all counter readings of Y or less by the maximum count of counter CT, as will be described with reference to FIG. 5. This of course only gives an approximately correct result, but such approximation can be satisfactory provided that Y is not too large.

Considering now the situation where the firing routine is required to be initiated in response to an interrupt If just after one of the interrupts I1 to I6, (corresponding to a small value of the least significant byte in register FAR) it may be that the interrupt If is required to occur in the period taken by the program of FIG. 3 to traverse the steps 13 to 22 in response to the occurrence of the relevant one of the interrupts I1 to I6. As the counter is loaded so as to produce the interrupt If only in the step 22 it is obvious that the interrupt If cannot occur before the step 22 is carried out. This problem can be overcome by, when the most significant byte MSB of FAR becomes 1 in step 20, arranging that the least significant byte LSB of FAR is tested to determine whether it is less than a predetermined amount X which is so chosen that, if this is not the case, there will be sufficient time after the next interrupt to set the counter CT to produce the interrupt whereas, if it is the case, there will not be sufficient time. If the LSB is found to be less than X the counter CT can then be loaded by an amount D so that the next counter interrupt will occur D count steps earlier than it would otherwise, and the amount D can also be added to the LSB of FAR to compensate. Thus is can be arranged that there will now be sufficient time for the counter CT to be reloaded to produce the interrupt If at the correct instant. This will also be explained further with reference to FIG. 5, as will the corrections which will have to be applied inter alia to the content of register TACH if a tachogenerator signal should occur when the counter content has thus been artificially altered with respect to what it would otherwise be.

Considering finally the situation where the firing routine is required to be initiated in response to an interrupt If just before one of the interrupts I1 to I6, and considering the fact that when counter CT is loaded in step 29 so as to generate this next interrupt at the correct time the least significant byte of FAR with which it is then loaded should in fact be compensated (in fact increased) for the number of counts taken by the routine to traverse steps 13, 25, (26), 27, 28 and 29, it may be that this increased LSB of FAR is in fact greater than the maximum count of counter CT, i.e. is in fact a very small number, with the result that, unless special steps are taken, the next interrupt will not be generated at all. (In fact by the time step 29 is completed the time at which the next interrupt should have occurred has already passed). The timing of subsequent interrupts is not affected but obviously it is necessary to replace the missing one. To this end it can be arranged that, if the corrected and therefore increased LSB of FAR is greater than the maximum count of counter CT, the "missing" interrupt is generated artficially. This will also be described further with respect to FIG. 5.

Figure 5C:
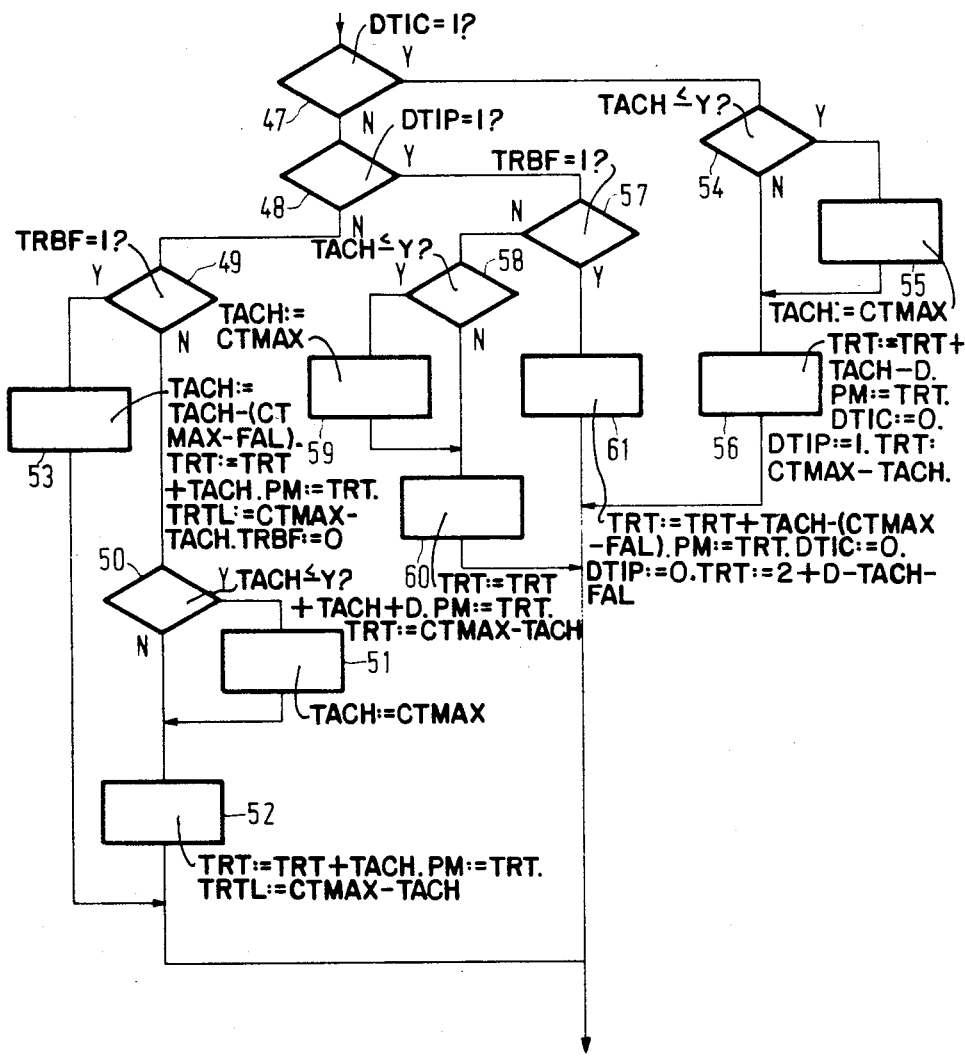

FIG. 5 shows modifications to the flow chart of FIG. 3 to collectively enable the microcomputer 1 to deal satisfactorily with the three difficult situations set forth above. More specifically FIG. 5A shows a replacement 29A for the block 29 of FIG. 3, FIG. 5B shows a replacement 16A for the block 16 in FIG. 3, FIG. 5C shows a replacement for the blocks 17, 18 and 19 in FIG. 3 and FIG. 5D shows a replacement for the direct connection between the "no" output of test 21 and the junction of the input of test 23 and the output of block 22. The various blocks in FIG. 5 have the following significances:

FIG. 5A

68—Read content of counter CT (amount by which LSB of FAR has to be corrected) and store
36—Is displaced timer interrupt past flag DTIP set?
69—Add LSB of FAR to quantity stored in step 68.
38—Is result of step 69 greater than maximum count of counter CT.
37—Set counter CT to corrected LSB of FAR
39—Set counter CT to (corrected) LSB of FAR less the displacement quantity D.
70—Store amount by which result of step 69 exceeded maximum count of counter CT.
71—Set counter CT to its maximum count.
72—Set counter CT to what was stored in step 70.

FIG. 5B

40—Is displaced timer interrupt current flag DTIC set?
41—Reset flag DTIC. Set flag DTIP.
42—Add difference between capacity of counter CT and the displacement quantity D to the content of register TRT.
43—Increment MSB of TRT.
44—Is flag DTIP set?
45—Reset flag DTIP
46—Add the displacement quantity D to TRT.

FIG. 5C

47—Is displaced timer interrupt current flag DTIC set?

48—Is displaced timer interrupt past flag DTIP set?
49—Is timer read before fire flag TRBF set?
50—Is content of register TACH less than or equal to predetermined quantity Y?
51—Set content of register TACH to maximum count of counter CT (255).
52—Add content of register TACH to content of register TRT. Transfer result to register PM. Set register TRT (LSB) to difference between content of register TACH and the maximum capacity (256) of counter CT. (This corresponds exactly to what is done in block 19 in FIG. 3, the same situation being present in both cases).
53—Replace content of register TACH by this content from which has been subtracted the difference between the LSB of FAR and the maximum capacity of counter CT. Add resulting content of TACH to content of register TRT and transfer the result to register PM. Set contents of register TRT(LSB) to difference between maximum capacity of counter CT and the content of register TACH. Reset flag TRBF. (This corresponds exactly to what is done in blocks 18 and 19 in FIG. 3 taken together, the same situation being present in both cases).
54—Is content of register TACH less than or equal to the predetermined quantity Y?
55—Set content of register TACH to maximum count of counter CT.
56—Add difference between content of register TACH and displacement quantity D to content of register TRT. Transfer result to register PM. Reset flag DTIC and set flag DTIP. Set content of register TRT to the difference between the content of register TACH and the maximum capacity of counter CT.
57—Is tachogenerator read before fire flag TRBF set?
58—Is content of register TACH less than or equal to the predetermined quantity Y.
59—Set content of register TACH to maximum count of counter CT.
60—Add the content of register TACH plus the displacement quantity D to the content of register TRT. Transfer the result to register PM. Set content of register TRT to the difference between the content of register TACH and the maximum capacity of counter CT.
61—Add the content of register TACH, reduced by the difference between the maximum capacity of counter CT and the least significant byte FAL of FAR, to the content of register TRT. Transfer the result to register PM. Reset flags DTIC and DTIP. Set content of register TRT MSB+LSB to 2+ (displacement quantity D reduced by both the content of register TACH and the least significant byte FAL of FAR.

FIG. 5D

62—Does FAR most significant byte FAM=1?
63—If FAR least significant byte FAL less than the predetermined amount X?
64—Load counter CT with the displacement quantity D. Increment FAL by D. Set flag DTIC.

When the modifications of FIG. 5 are applied to the flow chart of FIG. 3 the resulting arrangement operates as follows.

Considering first the situation shown in FIG. 2, i.e. the situation in which the interrupt instant If is not too close to either of the instants I2 or I3, the results of tests 36, 38, 40 44, 47, 48 and 63 in FIG. 5 are "no" in each case, so the operation of the arrangement corresponds substantially exactly to that described with reference to FIG. 3, the only exception being that, if a tachogenerator signal results in the loading of register TACH with a quantity less than or equal to Y, this quantity is changed to the maximum count of counter CT in step 51, to allow for the situation where the tachogenerator signal occurs only just before one of the interrupts I1, I2, I3, I4, I5, I6 or I7 with the result that the counter CT is actually read just after the relevant interrupt, when its content is very different from that which should have been read.

Considering now the situation where the interrupt If occurs so close before the next interrupt I3 that the instant when the counter CT is subsequently loaded in step 37 in order to produce the interrupt I3 actually occurs after the instant at which I3 should have occurred. The result of test 38 is "yes", with the result that the routine performs steps 70–72 instead of step 37. Steps 70 and 72 between them achieve what would otherwise have been achieved by step 37, but prior to the loading of counter CT in step 72 it is loaded with its maximum count in step 71, so that it overflows, and generates the interrupt which would otherwise be missed, when step 72 is performed. Thus when test 12 in FIG. 3 is reached immediately afterwards the result is "yes", as required.

Considering finally the situation where the interrupt If is required to occur very shortly after the interrupt I2, so close in fact that there will not be time to traverse the steps 13 to 22 in FIG. 3 in response to the interrupt I2 before If is required to occur, when the most significant byte FAM of FAR has become 1 in step 20 in response to interrupt I1 the result of test 62 is "yes", with the result that the least significant byte FAL of FAR is tested in step 63 to see whether it is less than the predetermined amount X. The result of this test is also "yes" in the situation being considered, so that the counter CT is loaded with the displacement quantity D in step 64, so that the interrupt I2 will now occur D counting periods before it would have done otherwise, increasing the time between this interrupt and the subsequent interrupt instant If. The least significant byte FAL of FAR is increased by D so that the interrupt If still actually occurs at the correct instant and the "displaced timer interrupt current" flag DTIC is set to signal that an abnormal situation is present. The interrupt I2, advanced in time, is now awaited. Assuming first of all for the sake of simplicity that no tachogenerator signal occurs between the interrupt instants I1 and I3 when interrupt I2 occurs, the "displaced timer interrupt current" flag DTIC is reset and the "displaced timer interrupt past" flag DTIP is set in step 40, the difference between the displacement quantity D and the total capacity of counter CT is added to TRT in step 42 (the interval I1 to I2 is D counts shorter than it would otherwise be, with the result that the incrementation of TRT has to be reduced by D with respect to what is would otherwise be), and the counter CT is loaded in step 22 with D counts less than it would otherwise have been (because of the previous adjustment of FAL in stap 64) to compensate for the fact that I2 is advanced in time, so that interrupt If has to be delayed in time with respect thereto by the same amount, and interrupt If is awaited. When interrupt If occurs counter CT is set in step 39 to the (corrected) least significant byte FAL of FAR reduced by the displacement quantity D (and hence restored to the value it had before it was adjusted in step 64) in order that the interrupt I3 will occur at the correct time, and interrupt I3 is awaited. When interrupt I3 occurs the most significant byte of TRT is incremented by one in step 43, flag DTIP is reset in step 45, and the displacement quantity D is added to the least significant byte of TRT is step 46 (because the interval I2-I3 is D counts longer than it would otherwise have been). Thus the interrupt has been allowed to occur at the correct instant by displacing interrupt I2. Moreover TRT has been incremented by the correct amounts when the interrupts I2 and I3 occurred.

Obviously if a tachogenerator signal does occur in the interval I1-I3 when the interrupt I2 has been displaced forward in time in the manner described above the resulting content of register TACH will have to be suitably modified before it is used to update the content of register TRT to take account of the abnormal presetting and/or presetting/resetting instants of counter CT which are relevant at the time the tachogenerator signal occurs. This is the reason for the tests 47 and 48 in FIG. 5C and for the steps 54-61 if the answer to one of these tests is "yes".

It will be appreciated because of the above description that, if the interrupt I2 is to be displaced forward in time by D counting periods, flag "displaced timer interrupt current" (DTIC) is set in step 64 in response to interrupt I1. When this is the case then in fact this flag is reset in response to interrupt I2 and, moreover, flag "displaced timer interrupt past" (DTIP) is set. Flat DTIP is eventually reset in response to interrupt I3. Thus flag DTIC is effective from the point of view of processing in response to interrupt I2, i.e. processing of events occurring between interrupts I1 and I2, and flag DTIP is effective from the point of view of processing in response to interrupt I3, i.e. processing of events occurring between interrupts I2 and I3.

Consider first the situation where a tachogenerator signal occurs between interrupt I1 and (displaced) interrupt I2. The content of counter CT will be D more than it would otherwise be. Thus it has to be reduced by D in order to give the time which has elapsed since interrupt I1 (for addition to TRT), whereas it gives a correct indication of the time which will elapse before I2 occurs (for initialization of TRT). In this situation the answer to test 47 is "yes" so that, after correction of the content of TACH if it is very small by means of step 55, operations suitably modified with respect to the operations 52 carried out in the corresponding "non-displaced interrupt" situation are performed in step 56.

Consider now the situation where a tachogenerator signal occurs between (displaced) interrupt I2 and interrupt If, resulting in "timer read before firing" flag TRBF being set in step 26 in response to interrupt If. Counter CT was loaded in step 22 in response to interrupt I2 with the difference between the total capacity of counter CT and the least significant bit FAL of FAR previously increased by D in step 64, so the time after interrupt I2 at which the tachogenerator signal occurs (for addition to TRT) is the content of register TACH reduced by this amount. Moreover, because the time between interrupts I2 and I3 is two complete fill periods of counter CT less (the total capacity of conter CT-D) count periods, the time between the occurrence of the tachogenerator signal and interrupt I3 (for initialization of TRT) is this amount less the time from I2 to the tachogenerator signal occurrence, i.e. to two complete fill periods less (total capacity of CT-D) less (content of register TACH—(total capacity of CT-FAL), i.e. to two complete fill periods +D—content of register TACH -FAL). In this situation the answer to test 47 is "no", the answer to test 48 is "yes" (interrupt I3 has just occurred) and the answer to test 57 is "yes", and it will be noted that the updating of TRT specified with respect to block 61 which is therefore performed corresponds to that set forth above.

Consider finally the situation where a tachogenerator signal occurs between If and interrupt I3. Counter CT was loaded in step 39 in response to interrupt If with the LSB FAL of FAR previously increased by D in step 64 but reduced by D again. The time from interrupt If to the occurrence of the tachogenerator signal is therefore the content of register TACH—(current value of FAL-D). The time from interrupt I2 to the occurrence of the tachogenerator signal (for addition to TRT) is therefore equal to this quantity plus the time from I2 to If, i.e. to this quantity plus the current value of FAL, i.e. to the content of register TACH +D. As the counter CT will fill at the instant I3 the time between the occurrence of the tachogenerator signal and the interrupt I3 (for initialization of TRT) is simply the difference between the total capacity of counter CT and the content of register TACH. In this situation the answer to test 47 is "no", the answer to test 48 is "yes" and the answer to test 57 is "no", and it will be noted that the updating of TRT specified with respect to block 60 which is therefore performed (if necessary after correction of the content of register TACH in step 59) corresponds to that set forth above.

As described so far it will be appreciated that if, for example, a tachogenerator signal occurs in between the sensing of an interrupt If by means of test 12 and the actual firing of the triac in step 27, the firing instant will be delayed by the time taken to service the tachogenerator signal interrupt, which may be undesirable. In order to reduce the likelihood of this happening the tachogenerator signal interrupt system may be arranged to be disabled immediately after RTFF=1 is sensed in step 13 (indicated by step 65 in dashed lines in FIG. 3) and be reenabled after the triac has actually been fired in step 27 (indicated by step 66 in dashed lines in FIG. 3). As mentioned previously, if a tachogenerator signal should occur while the interrupt system is disabled, the 8400 series microcomputer latches the fact that such a signal has occurred but does not perform an interrupt subroutine in response. Thus the occurrence of a tachogenerator signal between the sensing of RTF=1 in step 13 and the actual firing of the triac can be prevented in this way from affecting the firing instant, albiet at the expense of no longer knowing the exact reading of counter CT when the signal occurred. The fact that such a signal did occur can, however, be sensed by a suitable test in step 66 and, if it did, an estimated reading be entered into register TACH. This estimated reading may be, for example, the content of counter CT halfway through the period T during which the interrupt system was disabled, i.e. the least significant byte FAL of FAR plus T/2.

Obviously it is not essential that the complete fill period of counter CT is such that just over seven occupy the duration of one half-cycle of the input mains voltage waveform. Preferably, however it is arranged that, whatever this fill period actually is, the counter overflows a suitable short interval before a mains zero crossing is expected to occur, to facilitate polling for this mains zero crossing. If the complete fill period is such that, unless further steps are taken, the counter overflows for the last time during the period of mains half-cycle an appreciable time before the next zero-crossing is expected to occur, it may then be loaded by a suitable step inserted in the routine of FIG. 3 with an amount such that it overflows again just before the zero crossing is expected to occur. Obviously, is this is done the quantity stored in register TACH if a tachogenerator signal occurs during the resulting shortened final fill period will, when it is used to update and reinitialize TRT, have to be adjusted to take into account the fact that the counter has been pre-loaded.

The mains polarity detector 8 of FIG. 1 may comprise in known manner a pair of photocouplers with their input light-emitting diodes connected in antiparallel across the terminals 3 and 4 via a suitable resistance, and with their output photo-detectors coupled via waveform squaring circuits to inverting and non-inverting data inputs respectively of a D-type flip-flop the clock input of which is fed from the clock signal output CLK of microcomputer 1 (not shown in FIG. 1) and the output of which constitutes the output 8. The triac drive circuit of FIG. 1 may comprise in known manner a current amplifier the control input of which is fed from pins P10 and P11 of the microcomputer via an AND gate the other input of which is fed from the aforesaid pin CLK of microcomputer 1, and a current transformer which is driven by the current amplifier and the output winding of which is connected between the gate of triac 5 and one of the terminals 3 and 4 via a series diode.

From the foregoing, it will be appreciated that a single counter can surprisingly be used to provide separate and accurate timing for the firing angle delay and also for the timing of the tachogenerator period—despite the fact that the time periods overlap and the occurrences by means of which they are determined are essentially non-related. It will also be appreciated that there are a number of waiting periods between the processing of one interrupt (e.g. I2) and the arrival of the next interrupt (I3), in which the speed control processing is "inactive" pending the arrival of the next interrupt pulse and in which the microcomputer can proceed with a main program. If the speed control arrangement is to be used for controlling the speed of the motor of apparatus which operates in accordance with a processor-controlled programme, for example traction engines or domestic apparatus such as washing machines, this main program can be such as to control the said programme. When using for microcomputer 1 a microcomputer chosen from the MAB8400 series available from Mullard Limited, U.K. there was found to be adequate processor time available to perform fairly complex machine control programmes in addition to speed control.

The number of programmes and options were able to be increased, and a full fault-indication programme included, by increasing the number of tachogenerator pulses over which the tachogenerator running time TRT was measured at the higher speeds in the speed range. This was due to the fact that it was found that, at the higher speeds, smooth speed control could be obtained by using only a fraction of the tachogenerator pulses as interrupts. Since each pulse normally interrupts the processor programme for a time sufficient to register the current count value in counter/timer, then a reduction of the tachogenerator pulses fed to the arrangement as interrupts increases the time available for the main operating programme. In one embodiment using a 4-pole tachogenerator, the tachogenerator signal output frequency was divided by 16 when the drum speed was about 1000 r.p.m.

The amount of time occupied by the speed control process in each whole cycle of the mains voltage supply could, of course, be reduced by spreading the speed control routines described above over the whole cycle instead of during each of the two half cycles. It has been found, however, that the speed control may not then be as smooth in some circumstances as would be generally acceptable in modern speed-controlled machines.

I claim:

1. A motor speed control arrangement for controlling the motor speed in dependence upon the difference between the actual speed of the motor, as represented by the periodicity of signals from a tachogenerator driven by the motor, and the required speed, by controlling the phase angle at which a controlled semiconductor switch is fired in each half-cycle of a mains voltage supply by the control arrangement, the switch being connected in series with the motor across the mains voltage supply, said arrangement comprising, a programed digital data processing system which includes a clock-driven cycling counter having a cycle frequency which is a plurality of times the frequency of individual half-cycles of the mains voltage supply, said counter supplying an interrupt signal each time it overflows, first storage means for storing a number representative of the time elapsing between the arrival instants of a first and a subsequent second tachogenerator signal, second storage means for storing a number representative of the time which would elapse between the first and second tachogenerator signals if the motor were running at the required speed, and third storage means for receiving a number determined by the firing period from the beginning of a mains half-cycle to the instant in that half-cycle at which the switch is required to be fired in order to provide the appropriate speed control, said system being programed to (a) respond to the arrivals of the first and second tachogenerator signals by reading the contents of the counter at the relevant instants, (b) respond to at least some of said interrupt signals to adjust the content of the first storage means such that said content eventually depends upon the values of the counter contents so read and the number of counts executed by the counter between the interrupt immediately following the occurrence of the first tachogenerator signal and the interrupt immediately preceding the occurrence of the second tachogenerator signal thereby to represent the period between said instants, (c) calculate said firing period in dependence upon the contents of the first and second storage means when the content of the first storage means represents the period between said instants, (d) store a number determined by a firing period calculated in an operation (c) in said third storage means, (e) respond to the occurrence of each zero-crossing in the mains voltage waveform by, each time a said interrupt signal occurs thereafter, decrementing a number stored in the third storage means in an operation (d) by an amount corresponding to the number of counts executed by the counter since the immediately preceding interrupt occurred or, in the case of the first said interrupt after said subsequent zero-crossing, since that zero-crossing occurred, until the number stored in the third storage means becomes smaller than that which corresponds to a complete cycle period of the counter, (f) respond further to the interrupt signal which results in the number stored in the third storage means becoming smaller than that which corresponds to a complete cycle period of the counter by setting the counter content to a value determined by the difference between the then value of the number stored in the third storage means and the total counter capacity, and (g) respond to the occurrence of the next said interrupt signal to generate a fire conrol signal for said switch.

2. An arrangement as claimed in claim 1, including means for adjusting the content of the first storage means in operation (b) in response to the occurrence of all those said interrupt signals which do not result in the firing of the switch in an operation (g) and which occur after the arrival of the first tachogenerator signal up to and including the first such interrupt signal to occur after the arrival of the second tachogenerator signal.

3. An arrangement as claimed in claim 1, said system being programed to respond to the arrivals of a succession of said tachogenerator signals by repeatedly performing operation (a), each time treating the second tachogenerator signal and a subsequent tachogenerator signal as new first and second tachogenerator signals respectively, to repeat operation (b) each time the content of the first storage means has become representative of the period between the arrival instants of a pair of said tachogenerator signals so that the content of the first storage means becomes representative of the periods between the arrival instants of successive pairs of said tachogenerator signals in succession, and to repeatedly perform operation (c).

4. An arrangement as claimed in claim 1, 2, or 3 wherein said system is programed to respond to the occurrence of each zero-crossing in the mains voltage waveform by resetting the counter, and to respond to the occurrence of each interrupt signal which immediately precedes the expected arrival instant of a zero-crossing in the mains voltage waveform by polling the occurrence of such a zero-crossing.

5. An arrangement as claimed in claim 1, wherein said system is programed to further respond to the occurrence of the interrupt signal which results in the firing of the switch in operation (g) by setting the counter content to a value determined by the difference between the value to which it was set by the immediately preceding operation (f) and the total counter capacity so that the instant when the counter next overflows will occur a whole number of complete fill periods of the counter after the occurrence of the interrupt signal which immediately precedes the said interrupt signal which results in the firing of the switch.

6. A modification of an arrangement as claimed in claim 1 arranged to further respond to the occurrence of the interrupt signal which results in the firing of the switch in operation (g) by disabling the arrangement response to the arrival of a tachogenerator signal until the switch is actually fired, and to replace the relevant counter content which would otherwise be utilized in operation (c) by an estimate thereof if a tachogenerator signal should arrive while the arrangement response thereto is so disabled.

7. An arrangement as claimed in claim 2 wherein said system is programed to respond to the arrivals of a succession of said tachogenerator signals by repeatedly performing operation (a), each time treating the second tachogenerator signal and a subsequent tachogenerator signal as new first and second tachogenerator signals respectively, to repeat operation (b) each time the content of the first storage means has become representative of the period between the arrival instants of a pair of said tachogenerator signals so that the content of the first storage means becomes representative of the periods between the arrival instants of successive pairs of said tachogenerator signals in succession, and to repeatedly perform operation (c).

8. An arrangement as claimed in claim 3 wherein said system is programed to respond to the occurrence of each zero-crossing in the mains voltage waveform by resetting the counter, and to respond to the occurrence of each interrupt signal which immediately precedes the expected arrival instant of a zero-crossing in the mains voltage waveform by polling the occurrence of such a zero-crossing.

9. An arrangement as claimed in claim 3 wherein said system is programed to respond to the occurence of each zero-crossing in the mains voltage waveform by resetting the counter, and to respond to the occurrence of each interrupt signal which immediately precedes the expected arrival instant of a zero-crossing in the mains voltage waveform by polling the occurrence of such a zero-crossing.

10. An arrangement as claimed in claim 2 wherein said system is programed to further respond to the occurrence of the interupt signal which results in the firing of the switch in operation (g) by setting the counter content to a value determined by the difference between the value to which it was set by the immediately preceding operation (f) and the total counter capacity so that the instant when the counter next overflows will occur a whole number of complete fill periods of the counter after the occurrence of the interrupt signal which immediately precedes the said interrupt signal which results in the firing of the switch.

11. An arrangement as claimed in claim 4 wherein said system is programed to further respond to the occurrence of the interrupt signal which results in the firing of the switch in operation (g) by setting the counter content to a value determined by the difference between the value to which it was set by the immediately preceding operation (f) and the total counter capacity so that the instant when the counter next overflows will occur a whole number of complete fill periods of the counter after the occurrence of the interrupt signal which immediately precedes the said interrupt signal which results in the firing of the switch.

12. A modification of an arrangement as claimed in claim 2 wherein said system is programed to further respond to the occurrence of the interrupt signal which results in the firing of the switch in operation (g) by disabling the arrangement response to the arrival of a tachogenerator signal until the switch is actually fired, and to replace the relevant counter content which would otherwise be utilized in operation (c) by an estimate thereof if a tachogenerator signal should arrive while the arrangement response thereto is so disabled.

13. A motor speed control apparatus for controlling the firing angle of a controlled semiconductor switch connected in series with the motor across a source of AC supply voltage comprising: a clock-driven cycling counter operative at a frequency greater than the frequency of the AC supply voltage so as to supply an interrupt signal each time it overflows, first storage means responsive to pulse signals determined by the actual motor speed so as to store a digital number representative of the time between the arrival instants of successive pulse signals, second storage means for storing a digital number representative of the time between successive first and second pulse signals when the motor is at the required speed, and third storage means for receiving a digital number determined by the firing period of the switch required to provide the appropriate speed control, and means for performing the following operations, (a) responding to said pulse signals to read the contents of the counter, (b) responding to at least some of said interrupt signals to adjust the contents of the first storage means to make said contents depend upon the values of the counter contents so read and the number of counts executed by the counter between the interrupt immediately following the occurrence of a first pulse signal and the interrupt immediately preceding a successive second pulse signal thereby to store a digital number representative of the period between said instants, (c) calculating said firing period in dependence upon the contents of the first and second storage means when the content of the first storage means represents the period between said instants, (d) storing a digital number in said third storage means determined by a firing period calculated in an operation (c), (e) responding to each zero-crossing of the AC supply voltage by, each time a said interrupt signal occurs thereafter, decrementing a number stored in the third storage means in an operation (d) by an amount corresponding to the number of counts executed by the counter since the immediately preceding interrupt occurred or, in the case of the first said interrupt after said subsequent zero-crossing, since that zero-crossing occurred, until the number stored in the third storage means becomes smaller than that which corresponds to a complete cycle period of the counter, (f) responding further to the interrupt signal so that the number stored in the third storage means becomes smaller than that which corresponds to a complete cycle period of the counter by setting the counter content to a value determined by the difference between the then value of the number stored in the third storage means and the total counter capacity, and (g) responding to the occurrence of the next said interrupt signal to produce a signal to fire the semiconductor switch.

14. Apparatus as claimed in claim 13 wherein said performing means includes said first, second and third storage means.

15. A method of controlling the speed of a motor by controlling the firing angle of a controlled semiconductor switch connectable in series with the motor across a source of AC supply voltage comprising the following steps: generating interrupt signals by means of a counter, storing in a first storage device a number representative of the time elapsing between the arrival instants of first and second successive tachogenerator signals, storing in a second storage device a number representative of the time between successive first and second tachogenerator signals when the motor is at the required speed, supplying to a third storage device a number indicative of the firing period of the switch as required to provide the appropriate speed control, and (a) reading the counter contents in response to the first and second tachogenerator signals, (b) adjusting the contents of the first storage device in response to some of the interrupt signals so that said contents eventually depend upon the values of the counter contents so read and the number of counts executed by the counter between the interrupt immediately following the occurrence of the first tachogenerator signal and the interrupt immediately preceding the occurrence of the second tachogenerator signal thereby to represent the period between said instants, (c) calculating said firing period depending upon the contents of the first and second storage devices when the contents of the first storage device represents the period between said instants, (d) storing a number in the third storage device determined by firing period calculated in an operation (c), (e) responding to each zero-crossing of the AC supply voltage by, each time a said interrupts signal occurs thereafter, decrementing a number stored in the third storage device in an operation (d) by an amount corresponding to the number of counts executed by the counter since the immediately preceding interrupt occurred or, in the case of the first said interrupt after said subsequent zero-crossing, since that zero-crossing occurred, until the number stored in the third storage device becomes smaller than that which corresponds to a complete cycle period of the counter (f) setting the counter contents to a value determined by the difference between the then value of the number stored in the third storage device and the total counter capacity in response to an interrupt signal which results in the number stored in the third storage device becoming smaller than that which corresponds to a complete cycle period of the counter, and (g) generating a fire control signal for the switch in response to the next said interrupt signal that occurs.

* * * * *

UNITED STATES PATENT AND TRADEMARK OFFICE
CERTIFICATE OF CORRECTION

PATENT NO. : 4,584,507
DATED : April 22, 1986
INVENTOR(S) : CLIVE R. TAYLOR

It is certified that error appears in the above-identified patent and that said Letters Patent is hereby corrected as shown below:

In the Claims

Claim 1, second line from the bottom change "conrol" to --control--.

Claim 4, line 1, delete ", 2, or 3".

Claim 8, line 1, change "3" to --2--.

Claim 15, line 32, change "interrupts" to --interrupt--.

Signed and Sealed this

Ninth Day of December, 1986

Attest:

DONALD J. QUIGG

Attesting Officer

Commissioner of Patents and Trademarks